US007983787B2

(12) United States Patent
Garnett

(10) Patent No.: US 7,983,787 B2
(45) Date of Patent: Jul. 19, 2011

(54) METHODS OF MAKING ARTISTIC SCULPTURE AND SCULPTURES SO MADE

(76) Inventor: Alexander Garnett, Norwalk, CT (US)

( * ) Notice: Subject to any disclaimer, the term of this patent is extended or adjusted under 35 U.S.C. 154(b) by 1184 days.

(21) Appl. No.: 11/363,740

(22) Filed: Feb. 28, 2006

(65) Prior Publication Data

US 2007/0237908 A1    Oct. 11, 2007

(51) Int. Cl.
*G06F 19/00* (2006.01)
*B44C 5/00* (2006.01)
*B29C 45/00* (2006.01)
*B29C 45/14* (2006.01)

(52) U.S. Cl. ........................................ 700/163; 700/118

(58) Field of Classification Search .................... 428/13; 700/118
See application file for complete search history.

(56) References Cited

U.S. PATENT DOCUMENTS

| | | |
|---|---|---|
| D13,525 S | 1/1883 | Patterson |
| 629,312 A | 7/1899 | Beidler |
| 1,555,644 A | 9/1925 | Duncan |
| 1,618,772 A | 2/1927 | Merseburger |
| 2,067,766 A | 1/1937 | Keuls |
| D108,792 S | 3/1938 | Leiber |
| 2,197,577 A | 4/1940 | Crosser |
| 2,582,514 A | 1/1952 | Swisher |
| 2,769,276 A | 11/1956 | Steiner |
| 3,085,545 A | 4/1963 | Ore |
| 3,290,817 A | 12/1966 | Kravath |
| 3,708,897 A | 1/1973 | Adams |
| 3,927,482 A | 12/1975 | Marcus |
| 4,149,632 A | 4/1979 | Tunstull |
| 4,180,930 A | 1/1980 | DiMatteo |
| 4,279,090 A | 7/1981 | Shofner |
| 4,385,360 A * | 5/1983 | Yamada et al. ............... 700/163 |
| 4,854,214 A * | 8/1989 | Lowe ............................ 84/404 |
| 4,858,425 A | 8/1989 | Cheredaryk |
| 5,116,174 A * | 5/1992 | Fried et al. ..................... 409/79 |
| 5,276,997 A * | 1/1994 | Swearengin et al. ............. 47/82 |
| 5,570,208 A * | 10/1996 | Kato et al. ..................... 359/23 |
| 5,596,503 A * | 1/1997 | Flint ............................ 700/118 |
| 5,736,201 A * | 4/1998 | Flint ............................ 427/466 |
| 6,146,721 A | 11/2000 | Freynet |
| 6,363,644 B1 * | 4/2002 | Frost ......................... 40/607.03 |
| 6,455,835 B1 * | 9/2002 | Bernardini et al. ........ 250/208.1 |
| 6,652,256 B2 * | 11/2003 | Coe ............................. 425/130 |
| 6,878,422 B1 | 4/2005 | Spaar |
| 2002/0145103 A1 * | 10/2002 | Bernardini et al. ........ 250/208.1 |
| 2006/0003111 A1 * | 1/2006 | Tseng ............................ 428/16 |

OTHER PUBLICATIONS

"Turn Your Head Into A Pirolette", David Ponce, Aug. 10, 2005, "OhGizmo", 5 pages.*
Mori Seki, Model SL 25B CNC Turning Center, Feb. 24, 2006, starequipment.net.
Nakamura-Tome Co., STW/STS-40 Super Multi Tasking Turning Center, 2002, nakamura-tome.co.jp.
3D Systems Inc., InVision HR 3-D Printer, 2004, 3dsystems.com.
Materialize, Magics X for RP&M Industry, 2005, tenlinks.com.

(Continued)

*Primary Examiner* — Ramesh B Patel
*Assistant Examiner* — Sunray R Chang
(74) *Attorney, Agent, or Firm* — Thomas A Gallagher

(57) ABSTRACT

A method for creating a sculpture includes obtaining a profile of a person or thing, using the profile to create a three dimensional object in which the profile is revolved about an axis. The resulting sculpture shows the profile in positive space over its entire surface. Exemplary apparatus for carrying out the method include 3D printers and CNC lathes.

16 Claims, 13 Drawing Sheets

OTHER PUBLICATIONS

McNeel, Modeling Tools for Designers, 2005, rhino3d.com.
Wikipedia, G-code, Feb. 11, 2002, wikipedia.com.
Adobe Systems, Adobe Photoshop, 2006, adobe.com.
Adobe Systems, Adobe Illustrator, 2006, adobe.com.
Beshara, Turn Your Head, 2005, core77.com.
Beshara, Turn Your Head, 2004-2005, turnyourhead.com.

* cited by examiner

METHODS OF MAKING ARTISTIC SCULPTURE AND SCULPTURES SO MADE

BACKGROUND OF THE INVENTION

1. Field of the Invention

This invention relates broadly to sculptured articles of manufacture and methods for making them. More particularly, this invention relates to turned figures based on a profile or a stylized representation of a figure. In addition, the invention relates to arrangements of said sculptured articles.

2. State of the Art

Decorative representations and methods for creating them have been granted utility patent protection since at least the nineteenth century. U.S. Pat. No. 629,312 to Beidler (issued in 1899) discloses a campaign torch with a three dimensional representation of two human heads, presumably candidates. U.S. Pat. No. 1,555,644 to Duncan (issued in 1925) discloses a multiple face doll, as does U.S. Pat. No. 1,618,772 to Merseburger (issued in 1927). U.S. Pat. No. 2,197,577 discloses a three dimensional ornament for use on a Christmas tree as well as a method for making it. In 1973 U.S. Pat. No. 3,762,084 issued to Jones for a fish mobile and a method for making the fish.

In 1980 DiMatteo was granted U.S. Pat. No. 4,180,930 for a reflected three dimensional display wherein half of two symmetrical portions of an object is cut or embedded in one surface of a block of transparent material with a reflective surface such that the cut or embedded image is reflected to give the appearance of the complete object.

U.S. Pat. No. 4,858,425 to Cheredaryk et al. (issued in 1989) discloses a reflecting ornament string in which a plurality of reflecting members are connected with a thin cord so as to permit free rotation of each member relative to others.

More recently, U.S. Pat. No. 6,858,422 to Spaar discloses a three dimensional hanging decoration which is made from a flat, lightweight sheet of flexible material.

It is therefore clear from the foregoing that art and technology have combined many times to produce something ornamental or artistic.

The history of the art of sculpture dates from the stone age when small statues were made of soft stone, ivory, or clay. These statues have been found and dated by archeologists. As the art progressed, different materials were employed including metals such as copper, gold and silver. Different methods of making sculptured articles were employed depending on the material used and the size of the sculpture. The sphinx was carved out of living rock whereas the Mount Rushmore sculpture was created with the aid of explosives. The most common methods of sculpture today include carving, casting, and molding. However, some metal sculpture is created by torch cutting and welding or by assembly with fasteners such as screws or rivets.

In 2004, a Colorado craftsman named Tom Beshara created a wooden object which is turned on a lathe. The object is a solid artifact which resembles an urn or a table leg or a candle holder. However, it creates, in negative space, on opposite sides of the artifact two identical two-dimensional profiles facing each other. The effect is based on an old optical illusion which requires you to look not at the object but to look at the negative space surrounding it. Thus, it is not really a sculpture of any thing. It is an object which defines a negative space wherein a human profile can be perceived.

For many years, the present inventor has been creating different art forms that express human identity. In recent years, the present inventor began to contemplate turned figures illustrating human identity. Before learning about Mr. Beshra's products, the present inventor conceived of the invention described and claimed herein.

SUMMARY OF THE INVENTION

It is therefore an object of the invention to provide new methods for creating sculptured articles.

It is another object of the invention to provide artistic displays utilizing these new methods.

It is a further object of the invention to create sculptured articles which represent or suggest human identity.

In accord with these objects, which will be discussed in detail below, the methods of the invention include first creating a profile, either manually by drawing it or with the aid of backlit photography. The profile may be a realistic representation or an impressionistic representation. The profile is then used to create a solid sculpture which is a positive rotation of the profile about an axis. The resulting sculpture shows the profile on its three dimensional surface not in negative space. According to one method of the invention, the profile is used to create a CNC (computer numeric control) file which is used to operate a CNC equipped lathe. Suitable materials for use with the lathe include stone, metal, or wood depending on the cutting tool used in the lathe. The resulting article is a three dimensional object having a generally convex profile revolved about a longitudinal axis. When viewed, the profile can be seen in positive space over the entire surface of the object. According to another method of the invention, the profile is used to create a 3D printer file and a 3D printer is used to build an acrylic photopolymer sculpture. The resulting article is a three dimensional object having a generally convex profile revolved about a longitudinal axis. When viewed, the profile can be seen in positive space over the entire surface of the object.

In a first embodiment, a realistic profile of a human face is used and the resulting article resembles a bust but with only the features of the profile which are seen in positive space over the entire surface of the object. According to a second embodiment, a plurality of realistic human face profiles are acquired and connected to each other so that when the sculpture is complete one profile is atop the other somewhat like a totem pole. According to a preferred aspect of this embodiment, each of the faces are from members of the same family and the product is called the Family Totem™ or Revolutionary Family Toten™.

According to a third embodiment, a profile is obtained and a sculpture is created according to one of the methods described above. A plurality of objects are created in this manner and are suspended in a three dimensional field defined by a frame. According to a preferred aspect of this embodiment, the profiles are impressionistic profiles of nude female figures.

According to other embodiments of the invention, other profiles depicting or suggesting human identity are created and turned into solid objects according to one of the methods of the invention. Examples of profiles which depict or suggest human identity include, a profile of a city skyline (of the city where the person lives), a profile of a person's automobile, a profile of a person's hands, a profile of a person's pet, etc.

Additional objects and advantages of the invention will become apparent to those skilled in the art upon reference to the detailed description taken in conjunction with the provided figures.

DETAILED DESCRIPTION

Figure 1:
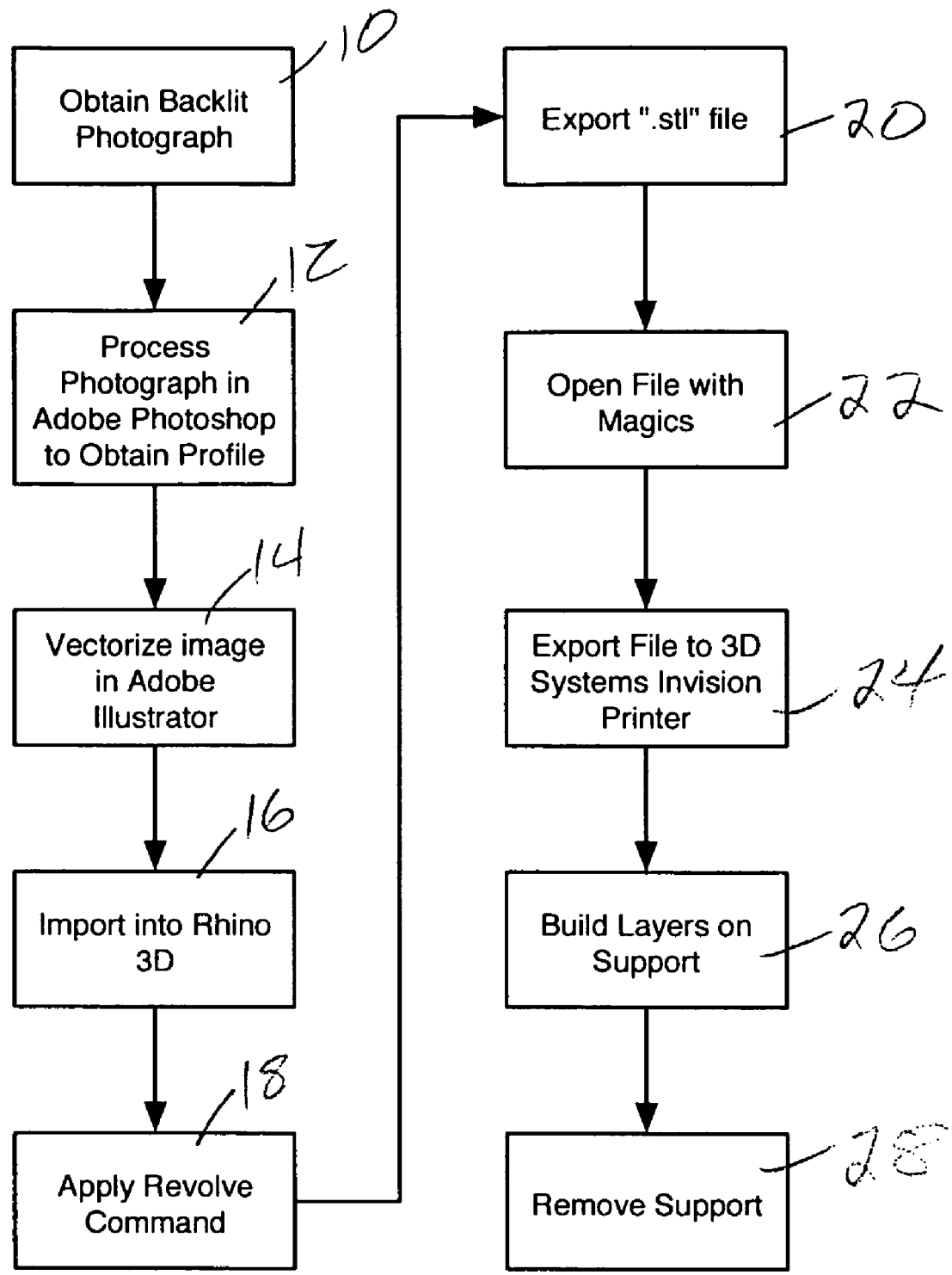
FIG. 1 is a simplified flowchart showing a first method according to the invention.
Figure 2:
FIG. 2 is a profile of a subject for a sculpture according to the invention.
Figure 3:
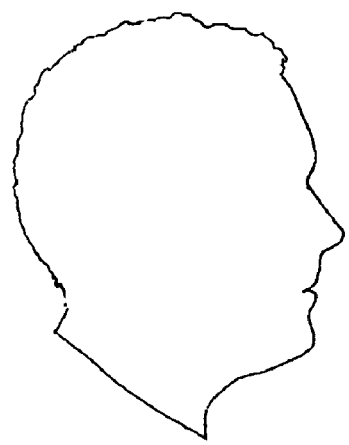
FIG. 3 is a schematic illustration of a backlit photo of the subject of FIG. 2.
Figure 4:
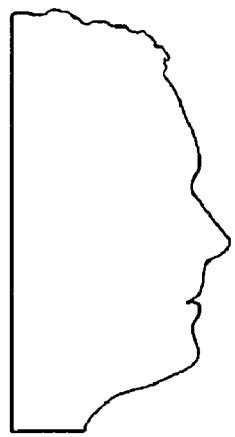
FIG. 4 is an illustration of the back lit profile with the rear of the head profile removed.
Figure 5:
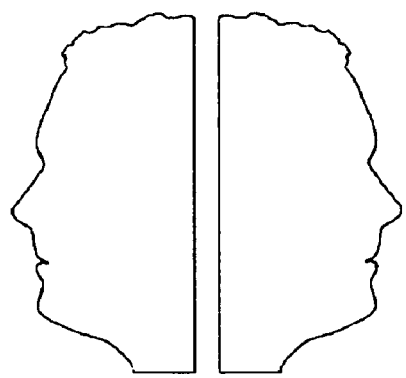
FIG. 5 is an illustration of the profile of FIG. 4 duplicated and the duplicate flipped.
Figure 6:
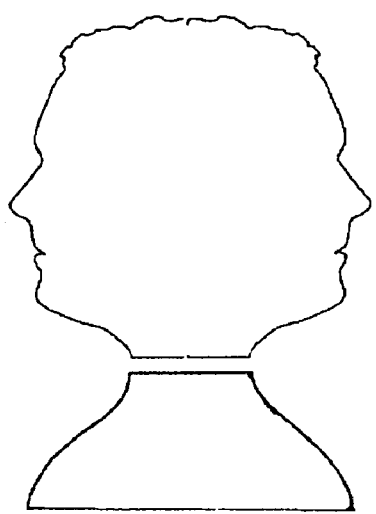
FIG. 6 is an illustration of the two copies of the profile joined and a suitable base below them.
Figure 7:
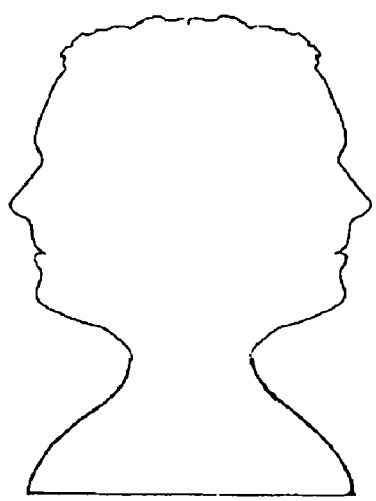
FIG. 7 is an illustration of the two copies of the profile and base all joined together providing a two dimensional representation of how the finished sculpture will appear.

Turning now to FIG. 1 and with reference to FIGS. 2 through 9, a method of making a sculpture begins with obtaining a profile. One way of doing this is to obtain a backlit photograph of the subject as indicated at 10 in FIG. 1. FIG. 2 illustrates a person's head and FIG. 3 schematically illustrates what a backlit photograph of the head looks like, i.e. no detail of the hairline, eye, ear, nose or mouth, just the outline or "profile". FIG. 3 is schematic because in a backlit photograph the profile would be filled with black. According to presently preferred methods, the photograph is either digital or digitized with a scanner and processed with image editing software such as Adobe® Photoshop® from Adobe Systems, Incorporated. This is indicated at 12 in FIG. 1. The processing steps include removing the black fill from the photo to obtain an image that looks like FIG. 3. Alternatively, the black filled profile can be traced in a separate layer. In either case, the back of the profile is removed to create an image like that shown in FIG. 4. The image of FIG. 4 is then copied and the copy is flipped horizontally as illustrated in FIG. 5. The two copies are joined and an aesthetically suitable base is drawn as shown in FIG. 6. The base is joined to the joined profiles as illustrated in FIG. 7. FIG. 7 is a two dimensional approximation of what the final product will look like.

Figure 8:
FIG. 8 is an illustration of the profile which will be used to generate an appropriate computer file to complete the sculpture either with a printer or a lathe.
Figure 9:
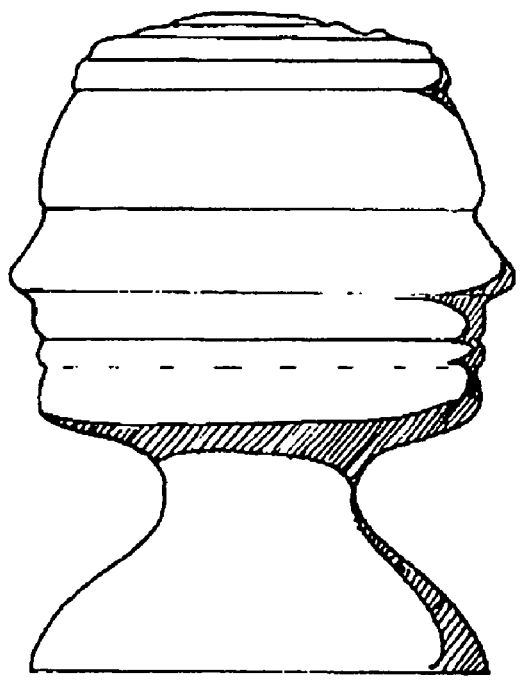
FIG. 9 is an illustration of a finished sculpture according to the invention where the shading illustrates shadow.

According to the invention, the profile will be revolved about an axis. Therefore, only half the profile is needed and thus, half may be removed leaving the profile of the head and base as shown in FIG. 8. Those skilled in the arts of computer graphics and computer aided manufacturing (CAM) will appreciate that image editing software such as Adobe® Photoshop® create and manipulate "bitmap" images and that CAM machines work with "vector" images or numeric representations of an image. The bitmap image of FIG. 8 is thus converted to a vector image. This can be accomplished by importing it into a vector drawing program such as Adobe® Illustrator®. This step in the method is indicated at 14 in FIG. 1.

A vector image such as an Adobe® Illustrator® file can then be imported into a 3D graphic modeling program such as Rhino™ from the McNeel Company. Thus, the vectorized image of FIG. 8 is imported into Rhino 3D as indicated at 16 in FIG. 1. Using the vector information, the 3D modeling program can be given a command and will "render" an image on the computer screen that appears three dimensional. In this case, the command is "revolve" and the resulting image looks like FIG. 9. The application of the revolve command is indicated at 18 in FIG. 1. This step in the method will show the artist an approximation of what the finished product will look like at this point, the artist can go back and alter the profile in the vector drawing program to alter the look of the sculpture if desired.

Many 3D modeling programs allow for the creation of a CAM file such as an .stl (stereo lithography) file which can be used by a 3D printer. Thus, such a file is created as indicated at 20 in FIG. 1.

According to the method illustrated in FIG. 1, a rapid prototyping and manufacturing (RP&M) program, such as Magics X from Materialize, Leuven, Belgium, is used to control a 3D printer, such as the InVision™ 3-D Printers from 3D Systems, Inc. Thus, the file created at 20 in FIG. 1 is opened at 22 with Magics and sent to the 3D printer at 24. These printers typically build acrylic photopolymer on a support to create the three dimensional article described by the computer file as indicated at 26 in FIG. 1. When the printing is complete, the support is removed as indicated at 28 in FIG. 1.

Figure 10:
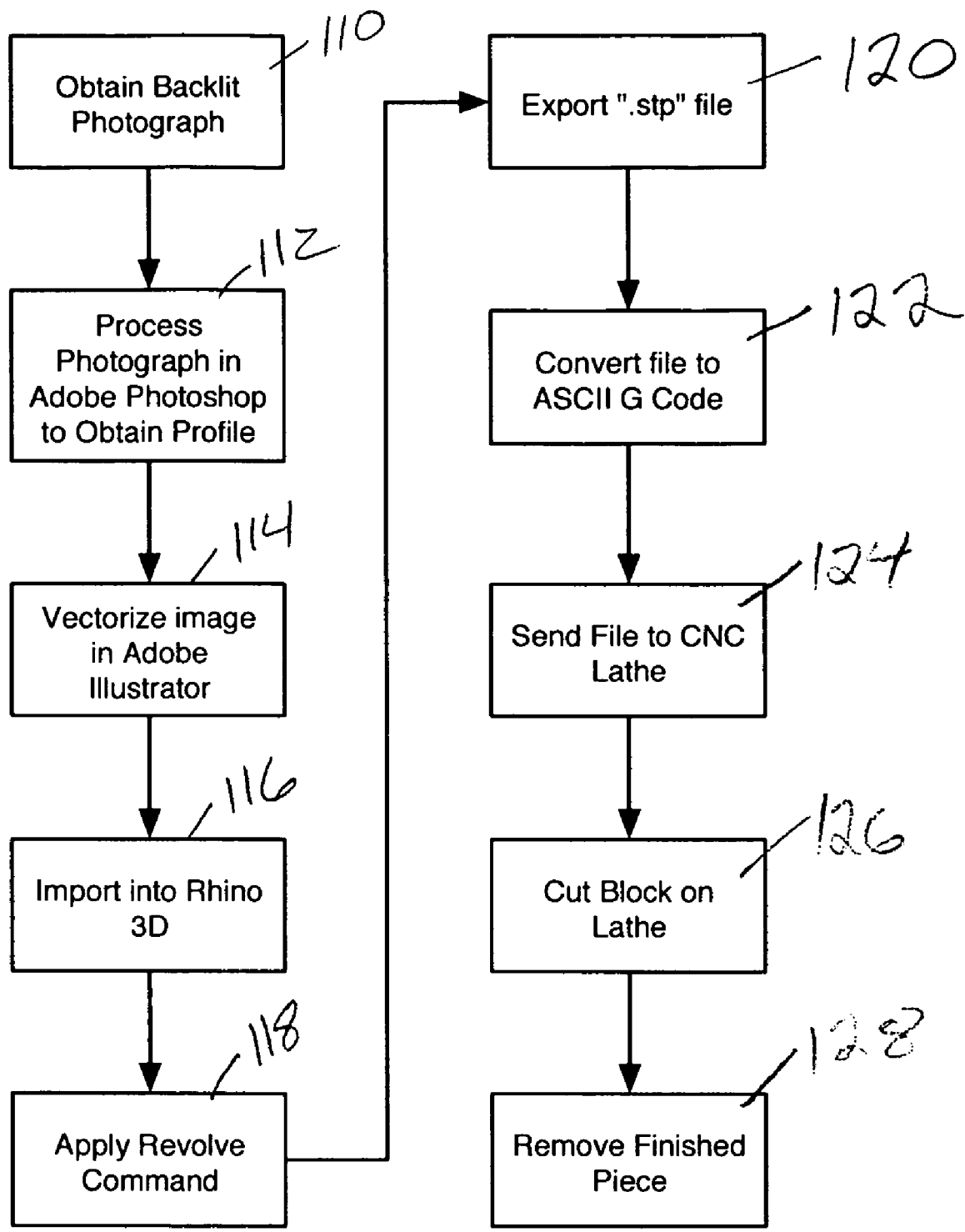
FIG. 10 is a simplified flow chart illustrating another method for making the sculpture of FIG. 9.

The method described with reference to FIG. 1 will produce an acrylic three dimensional object. However, the invention aims to create sculpture in different types of media and not just acrylic polymer. Thus, a second similar method is described in FIG. 10 which utilizes a CNC Lathe such as those available from Mori Seki Co. Ltd. and Nakamura-Tome Co. The method is substantially the same as that illustrated in FIG. 1 for method steps 110 through 118. The method differs starting at 120 where a step file (.stp) is created and optionally converted at 122 to an ASCII G code file. The G code (or the .stp file) is sent to a CNC lathe at 124 which uses it to cut a block of spinning material at 126. When the code is completed, the finished piece is removed at 128. CNC lathes can be used to cut metal, wood, marble, and stone. Thus, the method of FIG. 10 provides a wider choice of materials for the sculptures.

Figure 11:
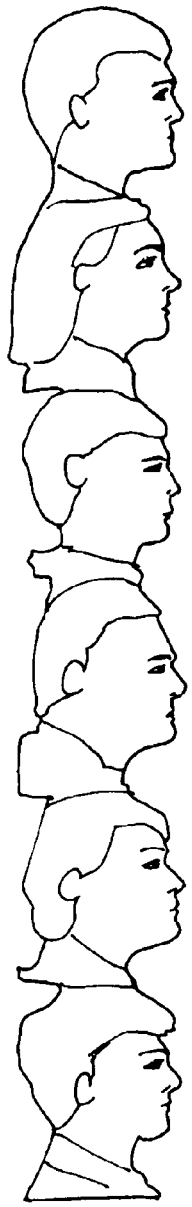
FIGS. 11 through 13 illustrate some of the steps in the process of making a totem sculpture according to the invention.
Figure 12:
Figure 13:
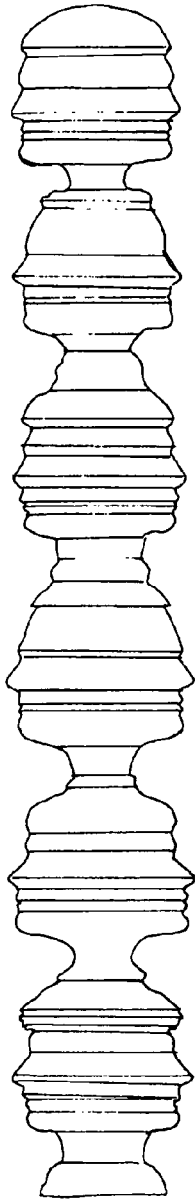

FIGS. 11 through 13 illustrate some of the steps used to create a Family Totem™ according to the invention. The process described above with reference steps 10 and 12 in FIG. 1 are repeated for several profiles shown in FIG. 11 and the profiles are joined together and vectorized as shown in FIG. 12. The vectorized image of FIG. 12 is then used in the process of either FIG. 1 or FIG. 10 to produce a solid turned sculpture as shown in FIG. 13 which is similar in some respects to a totem pole. According to the presently preferred embodiment, the totem comprises the profiles of several family members. Those skilled in the art may appreciate that the interface between the neck/shoulder/chest of one profile with the head of the profile below it may need to be "finessed" to achieve an aesthetically pleasing result.

Figure 14:
FIGS. 14 through 16 are computer generated images which illustrate impressionistic turned figures based on the human female body.
Figure 15:
Figure 16:
Figure 17:
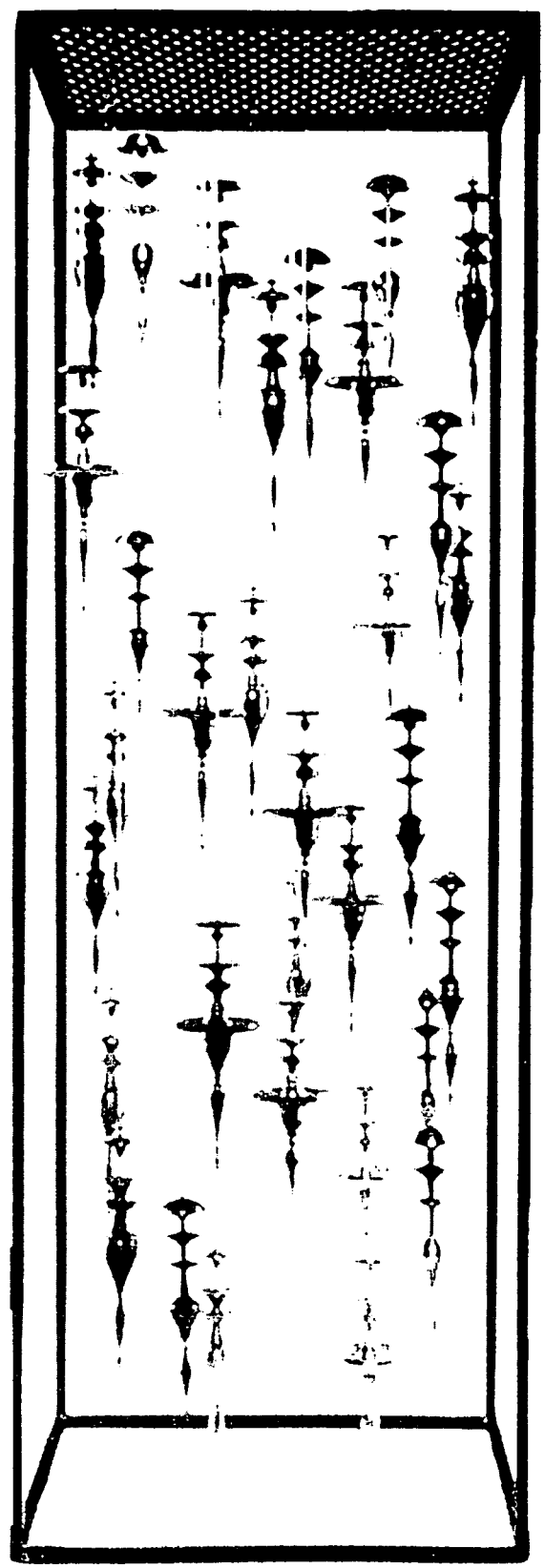
FIG. 17 is a photograph which illustrates a plurality of impressionistic figures arranged in a three dimensional space defined by a metal frame with the figures suspended by thin transparent filaments.

Turning now to FIGS. 14-17, another embodiment of the invention involves impressionistic profiles and a three dimensional arrangement of a plurality of sculptures. The turned sculptures shown in FIGS. 14-16 are based on an impressionistic representation of human female nude figures. As such, they are preferably drawn by hand rather than captured with digital photography. Alternatively, they may be captured with digital photography and then, after vectorizing, manipulated substantially. Because these figures lack a base, they are preferably displayed by suspending them. It is conceivable that a single such figure could be suspended or provided with a base, but an aspect of the invention shows a plurality of figures suspended in a three dimensional space which is defined by a frame as shown in FIG. 17. It is not necessary that all of the figures be unique, nor is it necessary that they all be made of the same material or be the same color. Other sculpture made according to the methods of the invention may also benefit from a suspended display such as that shown in FIG. 17.

Figure 18:
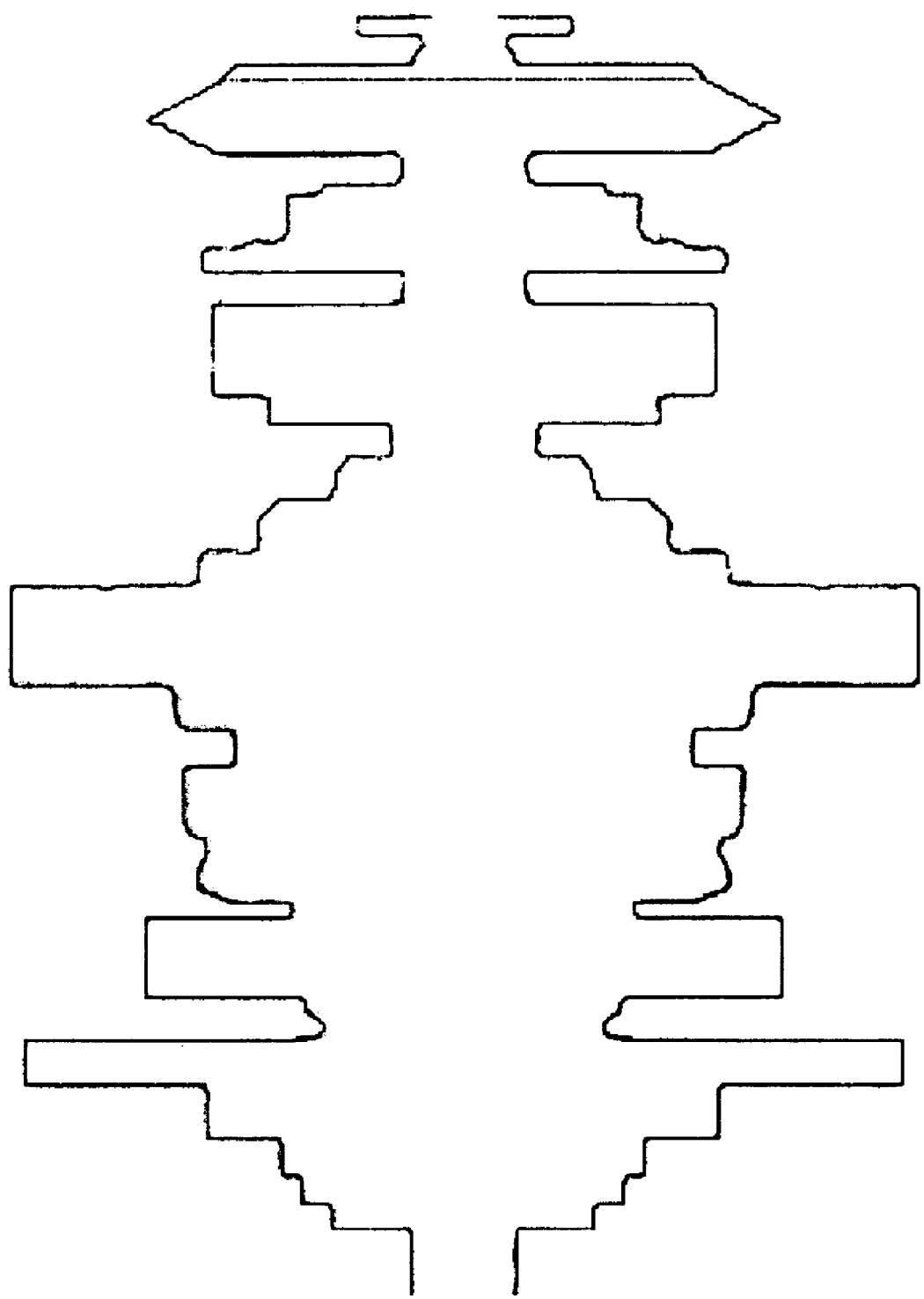
FIG. 18 is a two dimensional representation of a sculpture according to the invention of the profile of a city skyline.

FIG. 18 shows a two dimensional representation of a sculpture made according to the methods of the invention which is based on a city skyline. This can be more readily seen by viewing the sculpture with its axis or rotation aligned horizontally. Those familiar with the city will appreciate that the sculpture of FIG. 18 is based on the skyline of mid-town Manhattan, NYC. The sculpture of FIG. 18 is not shown with a base. A base may be provided or the sculpture may be suspended or it may be suspended in a three dimensional array with other related sculptures.

Figure 19:
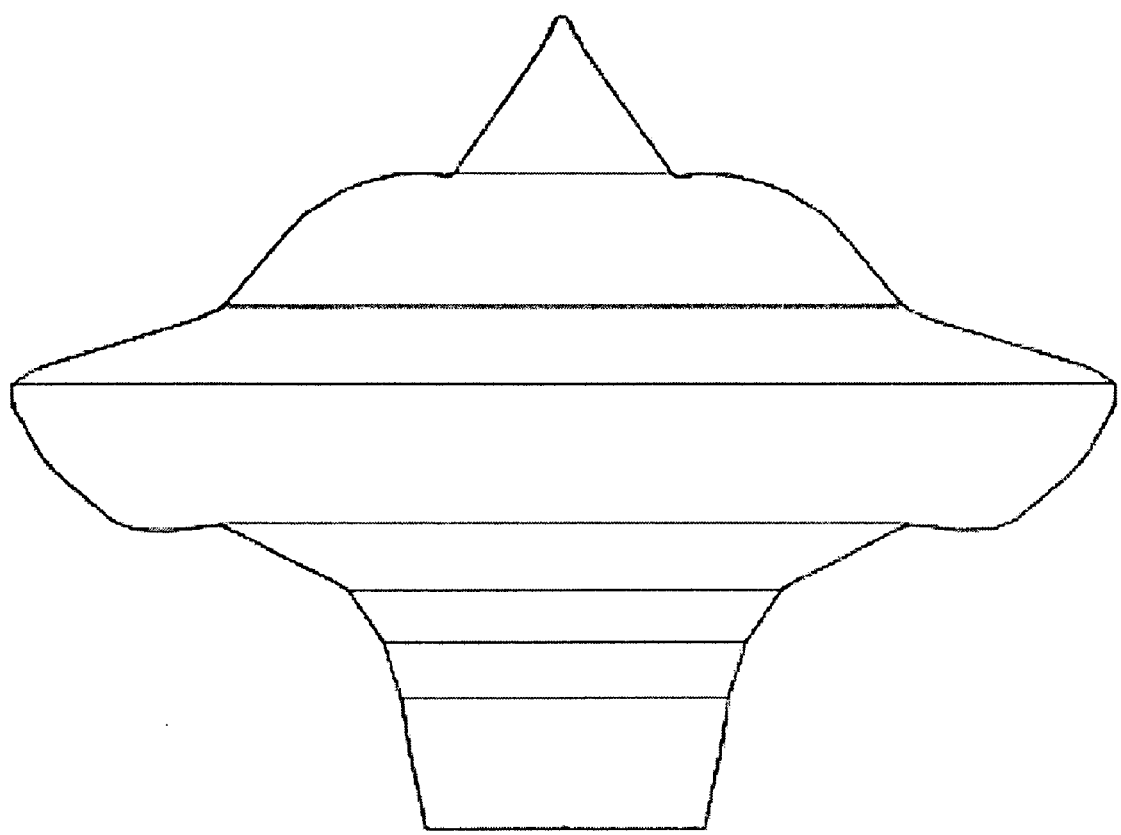
FIG. 19 is a two dimensional representation of a sculpture according to the invention of the profile of a dog's head.

FIG. 19 shows a two dimensional representation of a sculpture made according to the methods of the invention which is based on a dog's profile. This sculpture could be provided with a base or made part of a totem.

Figure 20:
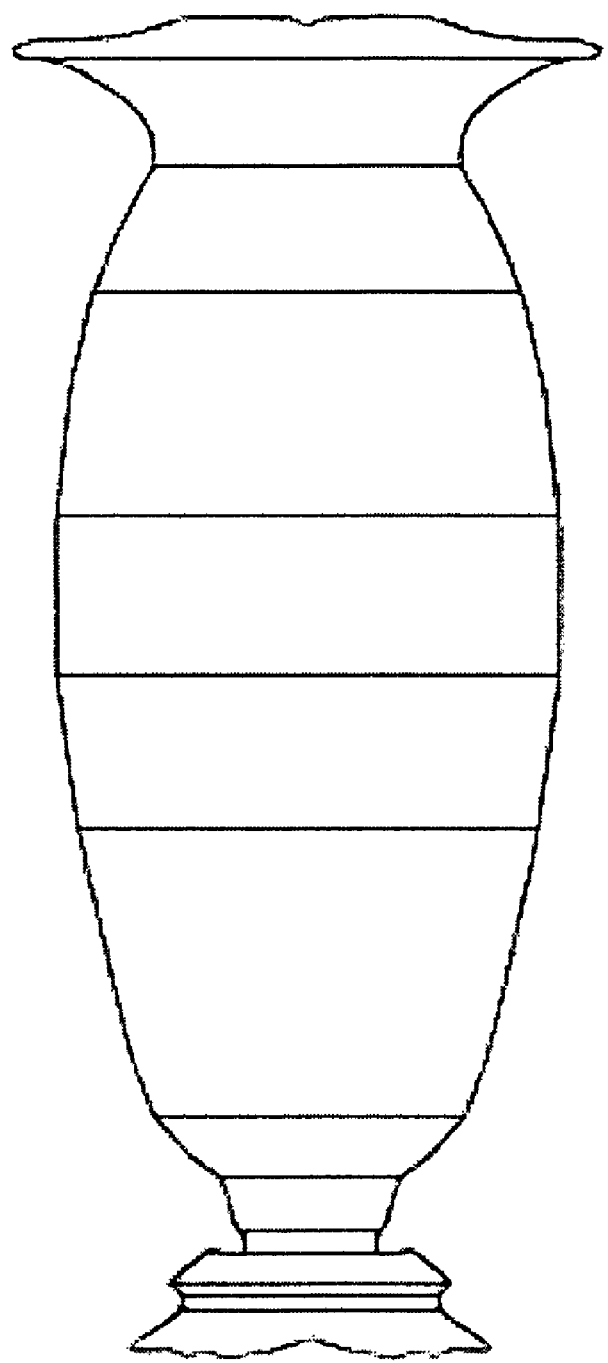
FIG. 20 is a two dimensional representation of a sculpture according to the invention of the profile of a penguin.

FIG. 20 shows a two dimensional representation of a sculpture made according to the methods of the invention which is based on the profile of a penguin. This could identify a person who lives or has lived where penguins live.

Figure 21:
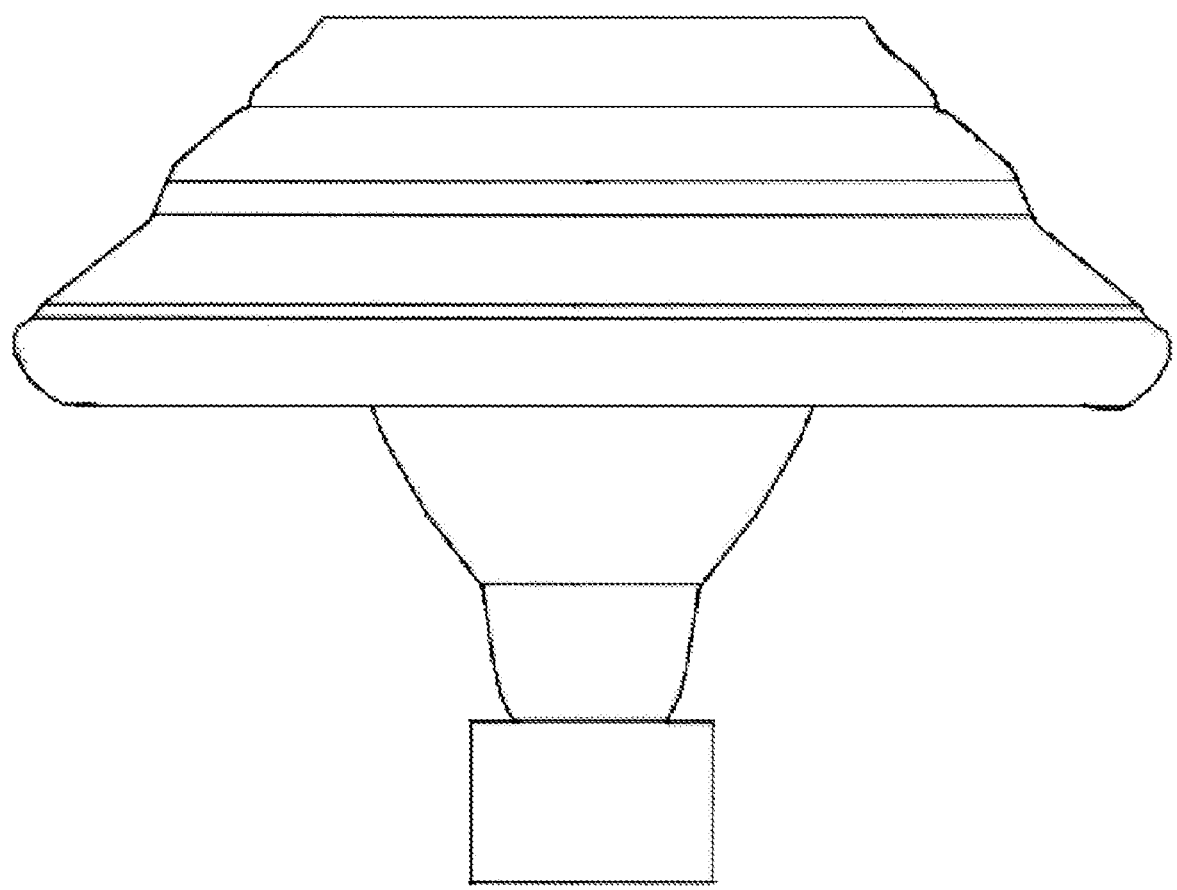
FIG. 21 is a two dimensional representation of a sculpture according to the invention of the profile of a horse head.

FIG. 21 shows a two dimensional representation of a sculpture made according to the methods of the invention which is based on a horse's head.

Figure 22:
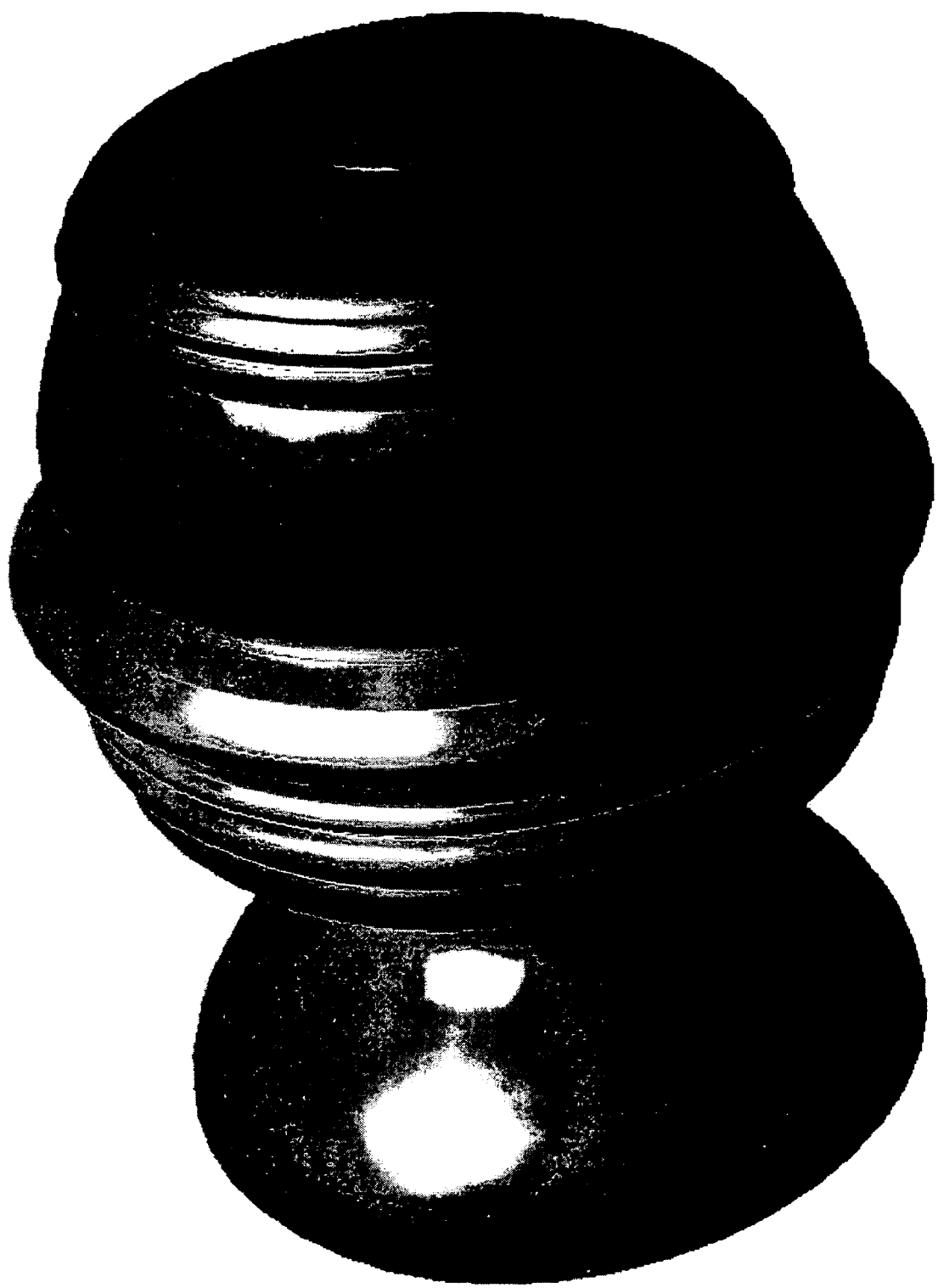
FIG. 22 is a three dimensional computer rendering of the expected appearance of a finished sculpture according to the invention.

FIG. 22 is a computer generated image such as the image generated at step 18 in FIG. 1.

Figure 23:
FIG. 23 is a photograph of three marble sculptures according to the invention.

FIG. 23 is a photograph of three marble sculptures made according to the methods of the invention. Here the three "busts" are of family members There have been described and illustrated herein several embodiments of methods for creating sculptures and sculptures created according to the methods. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A method of creating a three-dimensional decorative object, comprising:
   obtaining profiles of a plurality of living or inanimate things;
   generating one or more computer files based on the profiles;
   using the computer file or files to control one of a 3D printer or a lathe to produce the three-dimensional decorative object, wherein
   the three dimensional decorative object illustrates the profiles on its three dimensional surface in positive space with the three dimensional representations of the profiles arranged one atop the other.

2. The method according to claim 1, wherein:
the profiles are of human faces.

3. The method according to claim 2, wherein:
the human faces are faces of people related to each other.

4. The method according to claim 3, wherein:
the people are related to each other as members of the same family.

5. The method according to claim 1, wherein:
at least one profile is that of a city skyline.

6. The method according to claim 1, wherein:
at least one profile is that of an animal's head.

7. The method according to claim 1, wherein:
at least one profile is that of an automobile.

8. The method according to claim 1, wherein:
said three dimensional decorative object has a central axis and said three dimensional representations of the profiles arranged along said central axis.

9. A decorative object, comprising:
a solid object produced on a lathe or by a 3D printer,
said object having a three dimensional surface which is defined by a plurality of profiles revolved about an axis, said three dimensional surface illustrating the profiles one atop the other in positive space.

10. The decorative object according to claim 9, wherein:
at least one of the profiles is that of a human face.

11. The decorative object according to claim 9, wherein:
the profiles include a plurality of human faces arranged one atop the other.

12. The decorative object according to claim 11, wherein:
the faces are of people related to each other.

13. The decorative object according to claim 9, wherein:
the people are related to each other as members of the same family.

14. The decorative object according to claim 9, wherein:
at least one profile is that of an animal's head.

15. The decorative object according to claim 9, wherein:
at least one profile is that of an automobile.

16. The decorative object according to claim 9, wherein:
said plurality of profiles are spaced apart from each other along said axis.

* * * * *